(12) United States Patent
Liao (10) Patent No.: US 8,720,918 B2
(45) Date of Patent: May 13, 2014

(54) FOLDABLE SCOOTER (75) Inventor: Hsueh Tsan Liao, Shenzhen (CN)

(73) Assignee: Xin Xin Li Bicycle Fittings (Shenzhen) Co., Ltd., Shenzhen, Guangdong Province (CN)

( * ) Notice: Subject to any disclaimer, the term of this patent is extended or adjusted under 35 U.S.C. 154(b) by 112 days.

(21) Appl. No.: 13/542,658

(22) Filed: Jul. 5, 2012

(65) Prior Publication Data
US 2014/0008882 A1   Jan. 9, 2014

(51) Int. Cl.
*B62M 1/00* (2010.01)

(52) U.S. Cl.
USPC ............... 280/87.05; 280/87.041; 280/287

(58) Field of Classification Search
USPC ......... 280/287, 87.041, 87.01, 87.042, 87.05, 280/278, 87.021, 47.131, 47.15, 638, 639, 280/40, 603, 200
See application file for complete search history.

(56) References Cited

U.S. PATENT DOCUMENTS

| | | | |
|---|---|---|---|
| 6,120,044 A * | 9/2000 | Tsai ........................... 280/87.05 |
| 6,244,605 B1 * | 6/2001 | Liu ........................... 280/87.041 |
| 6,276,701 B1 * | 8/2001 | Chen ........................... 280/87.05 |
| 6,315,307 B1 * | 11/2001 | Chen et al. ........................ 280/40 |
| 7,584,974 B2 * | 9/2009 | Jackman et al. ........... 280/87.05 |
| 7,926,606 B2 * | 4/2011 | Wang ........................... 180/208 |
| 8,113,525 B2 * | 2/2012 | Lin ........................... 280/87.041 |
| 8,162,090 B2 * | 4/2012 | Atherton et al. ............... 180/208 |
| 8,388,006 B2 * | 3/2013 | Wu et al. ....................... 280/287 |
| 8,459,670 B1 * | 6/2013 | Tizzone .................... 280/87.042 |
| 8,465,033 B2 * | 6/2013 | Benarrouch ............... 280/87.05 |
| 8,490,985 B2 * | 7/2013 | Landau .................... 280/87.041 |
| 2002/0140193 A1 * | 10/2002 | Chai ....................... 280/87.041 |
| 2005/0212246 A1 * | 9/2005 | Hong ....................... 280/87.042 |
| 2006/0086553 A1 * | 4/2006 | Chen ............................. 180/208 |
| 2008/0315544 A1 * | 12/2008 | Jackman et al. ........... 280/87.05 |
| 2010/0044137 A1 * | 2/2010 | Atherton et al. .............. 180/223 |
| 2011/0031710 A1 * | 2/2011 | Lin ............................ 280/87.05 |
| 2011/0204599 A1 * | 8/2011 | Grossman ..................... 280/639 |
| 2012/0018968 A1 * | 1/2012 | Joslin et al. ............. 280/87.041 |
| 2012/0068427 A1 * | 3/2012 | Alva ........................... 280/87.05 |
| 2012/0104714 A1 * | 5/2012 | Sapir ........................... 280/87.05 |
| 2012/0228845 A1 * | 9/2012 | Wegener ................... 280/87.041 |
| 2012/0256386 A1 * | 10/2012 | Benarrouch ............... 280/87.05 |
| 2012/0292882 A1 * | 11/2012 | Ghisolfi et al. ................ 280/287 |
| 2012/0319373 A1 * | 12/2012 | Landau .................... 280/87.041 |
| 2013/0147139 A1 * | 6/2013 | Wegener ................... 280/87.041 |

* cited by examiner

*Primary Examiner* — Katy M Ebner
*Assistant Examiner* — Brodie Follman
(74) *Attorney, Agent, or Firm* — Cheng-Ju Chiang (57) ABSTRACT

A foldable scooter includes a pedal, front and rear wheel assemblies, a riser and two handlebars. The pedal includes front and rear parts hinged together and has a latch rod at an underside thereof to prevent the two parts from rotating toward each other. The front and rear parts respectively have a front shaft and a rear shaft extended in a front-rear direction along the pedal. The front wheel assembly includes a head tube, a front fork, a front wheel and a connecting base positioned to a rear side of the head tube and the front shaft. A positioning lever between the connecting base and the front part secures the front wheel assembly. The rear wheel assembly is positioned to the rear shaft, and a locking mechanism between the rear wheel assembly and the rear part prevents them from rotating relative to each other about the rear shaft.

12 Claims, 6 Drawing Sheets

FOLDABLE SCOOTER

TECHNICAL FIELD

This description relates to scooters, and more particularly relates to a foldable scooter.

DESCRIPTION OF BACKGROUND

Scooters can be used for sports and fitness, and also be used for quick travel. They are light to carry and it is easy to learn how to use them. Nowadays, the scooters become increasingly popular. A scooter mainly comprises a pedal, a front wheel assembly located at the front end of the pedal, and a rear wheel assembly located at the rear of the pedal, a riser located on the top of the front wheel assembly, and a handlebar located at the top of the riser. Traditional scooters cannot be folded and occupy a larger space, resulting in transportation and storage difficulties. Therefore, foldable scooters are proposed.

In some of existing foldable scooters, the handlebar is foldable relative to the riser; and in some other existing foldable scooters, the riser is foldable relative to the head tube of the front wheel assembly. Folding mechanism of the existing foldable scooters is similar to the common quick release folding device applied to folding bicycles, folding fitness or other foldable sport equipments. However, such foldable scooters have the following shortcomings: since the front wheel assembly and the rear wheel assembly are aligned along the same line and the pedal cannot be folded due to interference with other elements, the scooters cannot be completely folded and still occupy a large space. The transportation and storage difficulties are not yet effectively overcome.

SUMMARY

The present invention is to provide a foldable scooter which is capable of being fully folded.

A foldable scooter comprises a pedal, a front wheel assembly located at a front end of the pedal, a rear wheel assembly located at a rear end of the pedal, a riser located on a top of the front wheel assembly and two handlebars located on a top of the riser; the front wheel assembly comprises a head tube, a front fork configured at a bottom end of the head tube, a front wheel pivoted within the front fork, and a connecting base positioned to a rear side of the head tube; the pedal comprises a front part and a rear part hinged with the front part, the pedal has a latch rod at a bottom side thereof to prevent the front part and the rear part from rotating toward each other to be folded; the front part has a front shaft and the rear part has a rear shaft, both of the front shaft and the rear shaft are extended in a front-rear direction along the pedal, the connecting base of the front wheel assembly has a rear end thereof connected with a front end of the front shaft, and is connected to the front part by a positioning lever which is configured to secure the front wheel assembly. The rear wheel assembly is positioned to a rear end of the rear shaft, and a locking mechanism is configured between the rear wheel assembly and the rear part to prevent the rear wheel assembly from rotating relative to the rear part about the rear shaft.

Preferably, the front part forms a first front seat and a second front seat at an underside of front and rear ends thereof, and front and rear ends of the front shaft are respectively protruded out of the first front seat and the second front seat, and the front shaft is arranged with a front stopper which restricts an axial displacement range of the front shaft, and a front elastic element which keep the front shaft close to a back-end of the axial displacement range of the front shaft.

Preferably, the front shaft comprises a first lever which is located at the front end and protruded out of the first front seat, a second lever which is located at the rear end and protruded out of the second front seat, and a chain connecting the first lever and the second lever, the front stopper and the front elastic element are arranged on the first lever.

Preferably, the rear part forms a first rear seat and a second rear seat at an underside of front and rear ends thereof, and front and rear ends of the rear shaft are respectively protruded out of the first rear seat and the second rear seat, and the rear shaft is arranged with a rear stopper which restricts an axial displacement range of the rear shaft, and a rear elastic element which keep the rear shaft close to a front-end of the axial displacement range of the rear shaft.

Preferably, a quick release mechanism is positioned to the underside of the front part or the rear part via an elastic bolt, the quick release mechanism is pivoted with two pairs of rockers, and the front stopper and the rear stopper are respectively inserted between a corresponding pair of the rockers.

Preferably, the front elastic element is a compression spring which is sleeved on the front shaft and resisted against the first front seat and a front blocking flake fixed on the front shaft, and the rear elastic element is a compression spring which is sleeved on the rear shaft and resisted against the second rear seat and a rear blocking flake fixed on the rear shaft.

Preferably, the locking mechanism comprises latches and slots engaged with the latches.

Preferably, the latch rod is pivoted to the front part and the rear part defines a latch groove or forms a hook to fix a free end of the latch rod therein.

Preferably, the riser has a bottom end thereof connected to a top end of the heat tube of the front wheel assembly by means of a quick release folding device, the quick release folding device comprises a pedestal secured to the top end of the head tube, a post protruded upwardly from a centre of the pedestal, a clamp positioned at a bottom end of the riser, a quick release mechanism for tightly hooping the clamp to the post, a flange protruded upwardly from the pedestal in a direction parallel to the post and defining a threaded hole at a top of the flange, and two parallel rails extended outwardly from a side surface of the clamp. The rails respectively define an elongated groove therein, and the flange is inserted between the rails by a bolt which is extended through the elongated groove of one of the rails and threaded in the threaded hole, and finally extended into the elongated groove of another of the rails.

Preferably, the riser is provide with a quick release sleeve mechanism at a top end thereof, and the quick release sleeve mechanism is configured with a horizontal sleeve which is perpendicular to the riser and a pair of clips below the horizontal sleeve. The handlebars are capable of being inserted into the horizontal sleeve to steer the scooter or being vertically mounted to the clips to fold the scooter.

Preferably, the positioning lever has one end thereof hinged to the pedal and another end thereof detachably hinged to the connecting base by means of a locating pin.

In the invention, the front and rear wheel assemblies are capable of rotating about the corresponding shaft to be parallel to the pedal; and interlaced with each other after folded, so that the foldable scooter can be fully folded for space saving, and easy transportation and storage.

DETAILED DESCRIPTION OF THE EMBODIMENTS

As shown in FIG. 1 to FIG. 4, a foldable scooter in accordance with a preferred embodiment, comprises a pedal 1, a front wheel assembly 2 located at a front end of the pedal 1, a rear wheel assembly 3 located at a rear end of the pedal 1, a riser 4 located on a top of the front wheel assembly 2 and two handlebars 5 located on a top of the riser 4.

Figure 10:
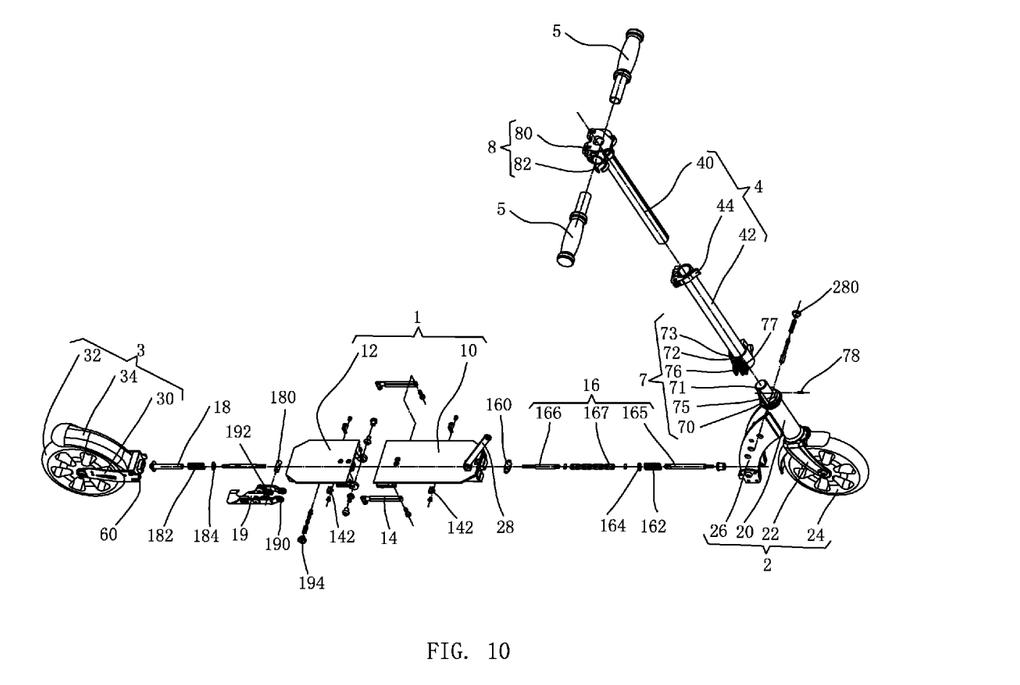
FIG. 10 is an exploded, isometric view of a foldable scooter in accordance with another embodiment of the present invention.
Figure 11:
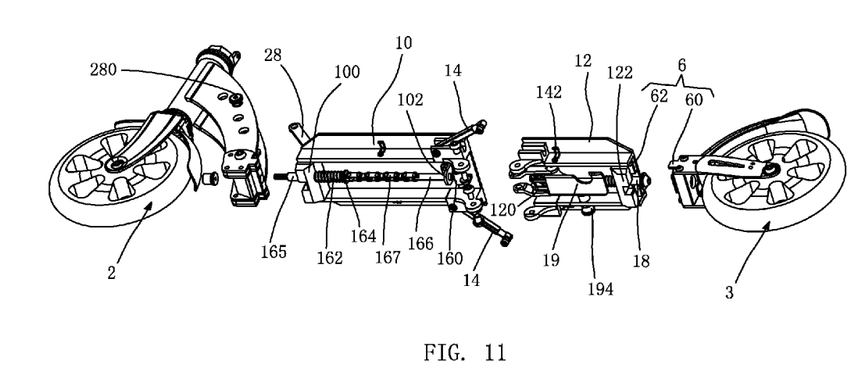
FIG. 11 is a partly exploded, isometric view of the foldable scooter in accordance with said another embodiment of the present invention.

The pedal 1 comprises a front part 10 and a rear part 12 hinged with the front part 10. The pedal 1 also has a latch rod 14 at a bottom side thereof to prevent the front part 10 and rear part 12 from rotating toward each other to be folded. In the embodiment shown in FIG. 1, the latch rod 14 is integrally bent to be L-shaped, the unbent end of the latch rod 14 is pivoted to the front part 10, and the rear part 12 defines a latch groove 140 to fix a free end of the latch rod 14 therein. In another embodiment as shown in FIG. 10 and FIG. 11, the latch rod 14 is configured to be L-shaped by securing a bolt perpendicularly to a free end of a straight lever, and a hook 142 is adopted to replace the latch groove 140.

The front part 10 has a front shaft 16 and the rear part has a rear shaft 18. Both of the front shaft 16 and the rear shaft 18 are extended in a front-rear direction along the pedal 1, and axially movable in a predetermined displacement range. The front part 10 forms a first front seat 100 and a second front seat 102 at an underside of front and rear ends thereof to hold the front shaft 16, and front end and rear end of the front shaft 16 are respectively protruded out of the first front seat 100 and the second front seat 102. A front stopper 160 is fixed to the front shaft 16 to restrict the axial displacement range of the front shaft 16, and a front elastic element 162 is arranged on the front shaft 16 to keep the front shaft 16 close to a back-end of the axial displacement range of the front shaft 16. The front elastic element 162 is preferred to be a compression spring sleeved on the front shaft 16. Opposite ends of the front elastic element 162 are respectively resisted against the first front seat 100 and a front blocking flake 164 fixed on the front shaft 16. In this embodiment, the front shaft 16 includes two pieces screwed on each other, and the front blocking flake 164 is fixedly clamped by the two pieces.

Since an integral straight shaft has a longer length, the center part of the shaft may be brought to be curved which causes the rotation axis to be easily changed, so that the front shaft 16 is interferential with the underside of the front part during rotation. While in another embodiment as shown in FIG. 10 and FIG. 11, the front shaft 16 is configured by a first lever 165 and a second lever 166 connected together through a chain 167, the first lever 165 passes through the first front seat 100, the second lever 166 passes through the second front seat 102. This structure of the front shaft having the chain 167 at the center to connect the first lever 165 and the second lever 166 together can avoid the above shortcoming of the integral straight front shaft caused by the curved center part thereof.

The rear part 12 forms a first rear seat 120 and a second rear seat 122 at an underside of front and rear ends thereof to hold the rear shaft 18, and front end and rear end of the rear shaft 18 are respectively protruded out of the first rear seat 120 and the second rear seat 122. A rear stopper 180 is fixed to the rear shaft 18 to restrict the axial displacement range of the rear shaft 18, and a rear elastic element 182 is arranged on the rear shaft 18 to keep the rear shaft 18 close to a front-end of the displacement range of the rear shaft 18. The rear elastic element 182 is preferred to be a compression spring sleeved on the rear shaft 18. Opposite ends of the rear elastic element 182 are respectively resisted against the second rear seat 122 and a rear blocking flake 184 fixed on the rear shaft 18. In this embodiment, the rear shaft 16 includes two pieces screwed on each other, and the rear blocking flake 184 is fixedly clamped by the two pieces.

The rear part 12 also has a quick release mechanism 19 at an underside thereof. The quick release mechanism 19 is pivoted with a pair of front rockers 190 and a pair of rear rockers 192 between the front rockers 190. The front rockers 190 and the rear rockers 192 have a common pivot axis about the quick release mechanism 19. The front stopper 160 is pivotally inserted between the front rockers 190 and the rear stopper 180 is pivotally inserted between the rear rockers 192. The quick release mechanism 19 is positioned to the underside of the rear part 12 via an elastic bolt 194. It can be understood that the quick release mechanism 19 can be positioned to an underside of the front part 10 in other embodiments.

The front wheel assembly 2 comprises a head tube 20, a front fork 22 configured at a bottom end of the head tube 20, a front wheel 24 pivoted within the front fork 22, and a connecting base 26 positioned to a rear side of the head tube 20. The connecting base 26 has a rear end thereof connected to the front end of the front shaft 16. A positioning lever 28 to secure the front wheel assembly 2 is configured between connecting base 26 and the pedal 1. The positioning lever 28 has one end thereof hinged to the pedal 1, and another end thereof detachably hinged to the connecting base 26 by means of a locating pin 280.

The rear wheel assembly 3 comprises a rear fork 30, a rear wheel 32 pivoted within the rear fork 30 and a rear mudguard 34. A locking mechanism 6 is configured between the rear fork 30 and the rear part 12 to prevent the rear wheel assembly 3 from axially rotating about the rear shaft 18. In the embodiment shown in FIG. 2, the locking mechanism 6 comprises latches 60 configured on the rear fork 30 and slots 62 defined in the rear part 12 for engaging with the latches 60.

The riser 4 is preferably a telescopic tube formed by an inner tube 40 and a jacket tube 42 which is capable of receiving the inner tube 40 therein and being locked with the inner tube 40 by a quick release band 44. The riser 4 has its bottom end connected to a top end of the head tube 20 of the front wheel assembly 2 by means of a quick release folding device 7. The quick release folding device 7 comprises a pedestal 70 secured to the top end of the head tube 20, a post 71 protruded upwardly from a centre of the pedestal 70, a clamp 72 positioned at a bottom end of the riser 4, a quick release mechanism 73 for tightly hooping the clamp 72 to the post 71, a flange 75 protruded upwardly from the pedestal 70 in a direction parallel to the post 71, and two parallel rails 76 extended outwardly from a side surface of the clamp 72. A threaded hole 74 is defined at a top of the flange 75. The rails 76 respectively define an elongated groove 77 therein, and the flange 75 is inserted between the rails 76 by a bolt 78 which is extended through the elongated groove 77 of one rail 76 and threaded in the threaded hole 74, and finally extended into the elongated groove 77 of another rail 76. It can be understood for the skilled in this field, during installation of the quick release folding device 7, the folding direction of the riser 4 can be controlled by adjusting angles of the pedestal 70 and the clamp 72, specially, by adjusting the orientation of the flange 75 of the pedestal 70 and the orientation of the rails 76 of the clamp 72. For example, as shown in FIG. 5, the riser 4 is folded to the right side of the scooter, while as shown in FIG. 6-FIG. 9, the riser is folded to the left side of the scooter.

The riser 4 is provided with a quick release sleeve mechanism 8 at a top end thereof. The quick release sleeve mechanism 8 is configured with a horizontal sleeve 80 which is perpendicular to the riser 4, and a pair of clips 82 below the horizontal sleeve 80. The handlebars 5 are capable of being inserted into the horizontal sleeve 80 to steer the scooter, or being vertically mounted to the clips 82 to fold the scooter.

Figure 1:
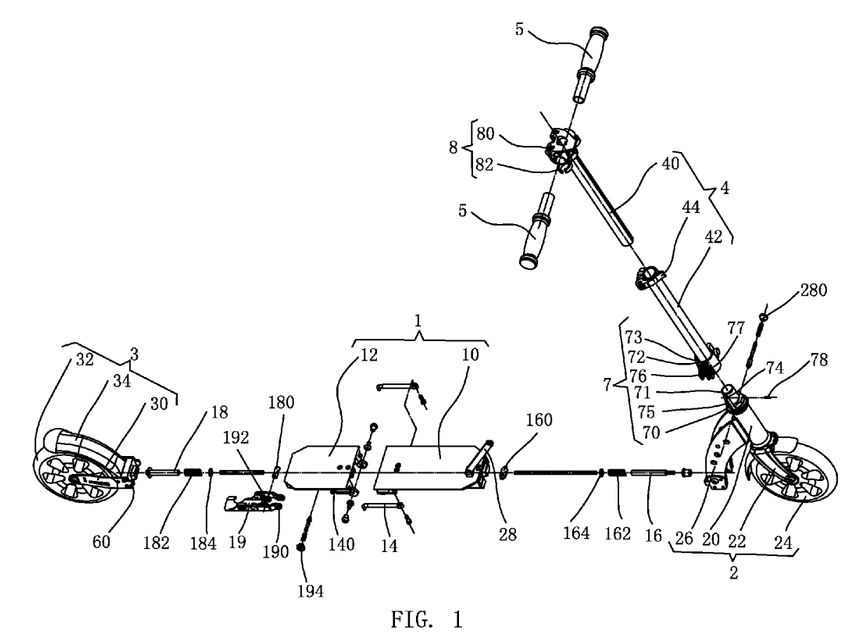
FIG. 1 is an exploded, isometric view of a foldable scooter in accordance with a preferred embodiment of the present invention.
Figure 2:
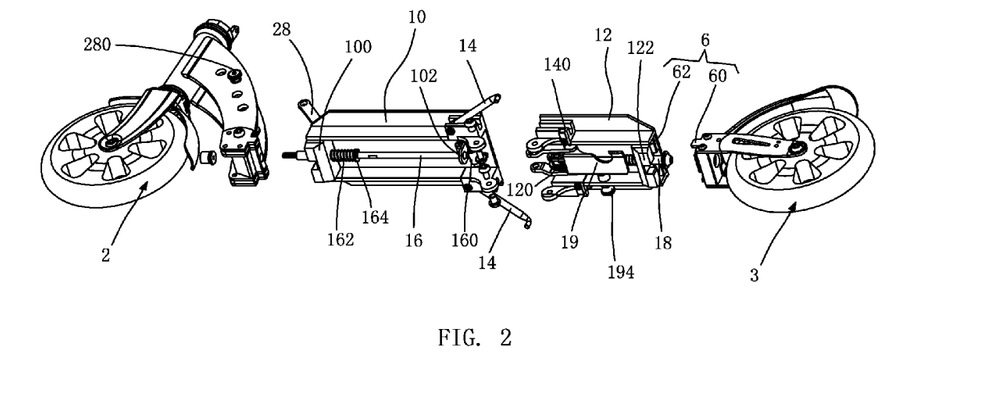
FIG. 2 is a partly exploded, isometric view of the foldable scooter in accordance with the preferred embodiment of the present invention.
Figure 3:
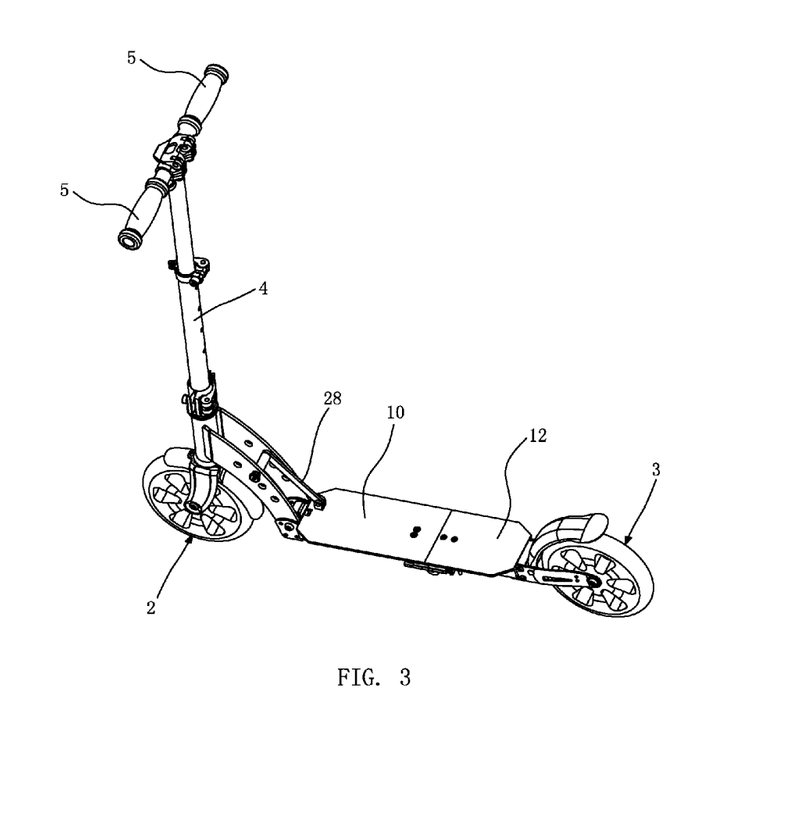
FIG. 3 is an assembled, isometric view of the foldable scooter in accordance with the preferred embodiment of the present invention.
Figure 4:
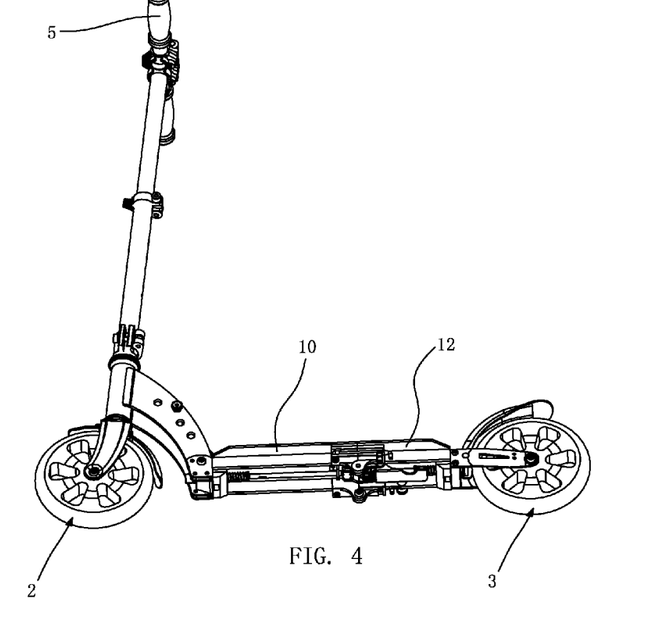
FIG. 4 is an assembled, isometric view of the foldable scooter in accordance with the preferred embodiment of the present invention, from another perspective.
Figure 5:
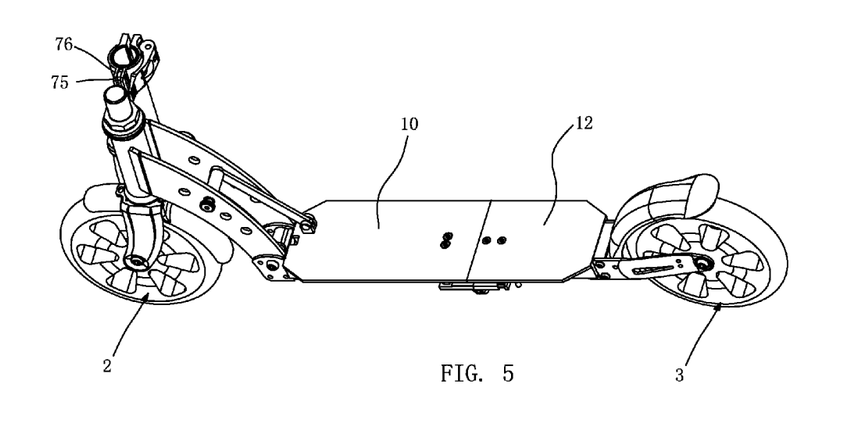
FIGS. 5~9 are views showing how to fold the foldable scooter in accordance with the preferred embodiment of the present invention.
Figure 6:
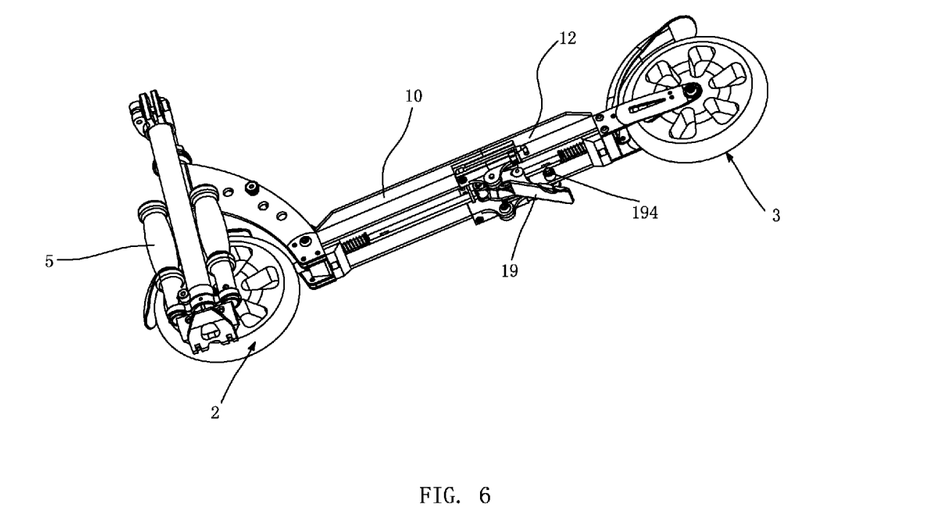
Figure 7:
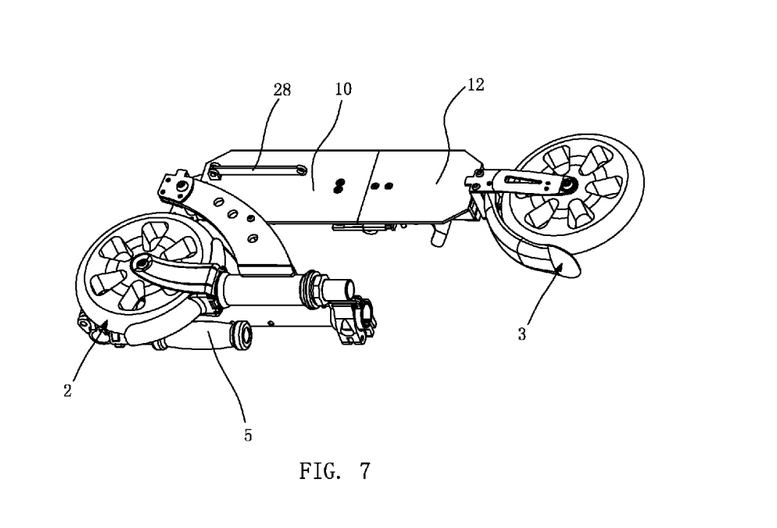
Figure 8:
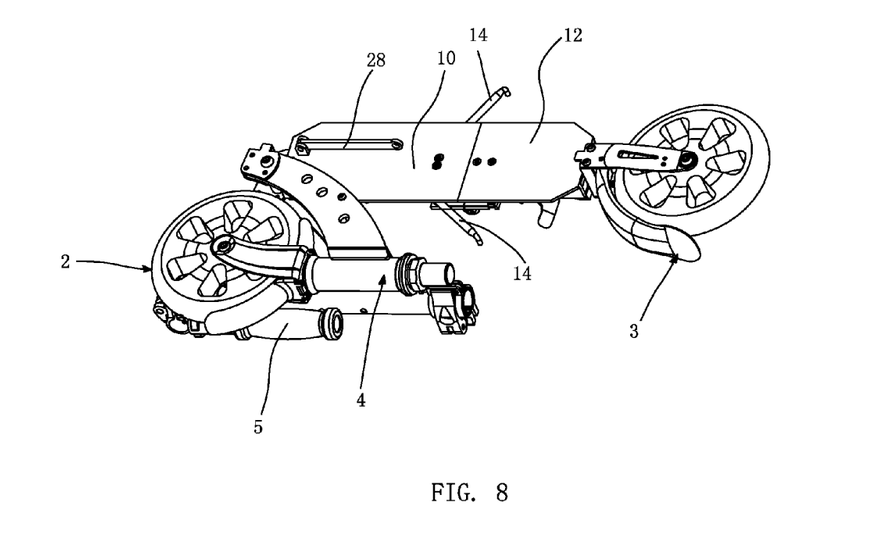
Figure 9:
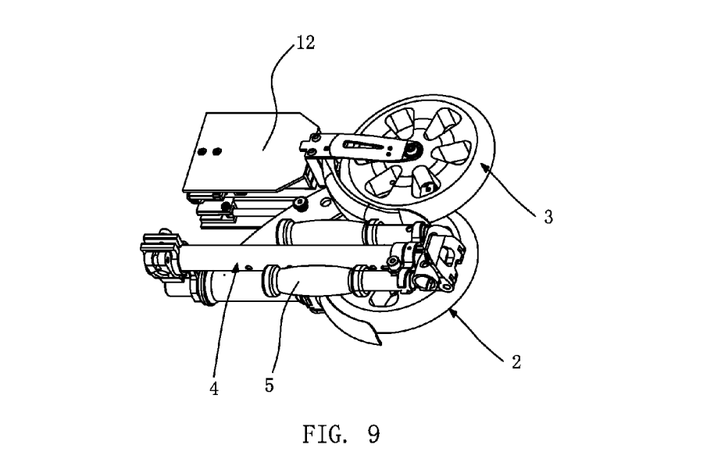

FIGS. 5~9 show how to fold the foldable scooter. To fold the scooter, the handle 5 is firstly taken out of the horizontal sleeve 80 and then vertically inserted into the clips 82. Then, the quick release mechanism 73 of the quick release folding device 7 is loosen, and the riser 4 is upwardly pulled to separate the clamp 72 from the post 71 so that the riser 4 is rotatable about the bolt 78 to be folded as shown in FIG. 5. The quick release mechanism 19 is loosened as shown in FIG. 6, and the locating pin 280 is pulled out so that the positioning lever 28 is detached from the connecting base 26. At this time, the rear wheel assembly 3 is capable of being pull backwardly and then rotatable about the rear shaft 18 to be parallel to the pedal 1 as shown in FIG. 7, and the front wheel assembly 2 is capable of being pull forwardly and then rotatable about the front shaft 16 to be parallel to the pedal 1 as shown in FIG. 7. The latch rod 14 is taken out of the latch groove 140 as shown in FIG. 8, and the rear part 12 with the rear wheel assembly 3 is thus capable of being folded relative to the front part 10 as shown in FIG. 9. The foldable scooter is thus fully folded.

What is claimed is:

1. A foldable scooter comprising a pedal, a front wheel assembly located at a front end of the pedal, a rear wheel assembly located at a rear end of the pedal, a riser located on a top of the front wheel assembly and two handlebars located on a top of the riser; the front wheel assembly comprising a head tube, a front fork configured at a bottom end of the head tube, a front wheel pivoted within the front fork, and a connecting base positioned to a rear side of the head tube; the pedal comprising a front part and a rear part hinged with the front part, the pedal having a latch rod at a bottom side thereof to prevent the front part and the rear part from rotating toward each other to be folded; the front part having a front shaft and the rear part having a rear shaft, both of the front shaft and the rear shaft being extended in a front-rear direction along the pedal, the connecting base of the front wheel assembly having a rear end thereof connected with a front end of the front shaft, and being connected to the front part by a positioning lever which is configured to secure the front wheel assembly, the rear wheel assembly being positioned to a rear end of the rear shaft, a locking mechanism between the rear wheel assembly and the rear part being configured to prevent the rear wheel assembly from rotating relative to the rear part about the rear shaft.

2. The foldable scooter as described in claim 1, wherein the front part forms a first front seat and a second front seat at an underside of front and rear ends thereof, and front and rear ends of the front shaft are respectively protruded out of the first front seat and the second front seat, and the front shaft is arranged with a front stopper which restricts an axial displacement range of the front shaft, and a front elastic element which keep the front shaft close to a back-end of the axial displacement range of the front shaft.

3. The foldable scooter as described in claim 2, wherein the front shaft comprises a first lever which is located at the front end and passes through the first front seat, a second lever which is located at the rear end and passes through the second front seat, and a chain connecting the first lever and the second lever, the front stopper and the front elastic element are arranged on the first lever.

4. The foldable scooter as described in claim 2, wherein the rear part forms a first rear seat and a second rear seat at an underside of front and rear ends thereof, and front and rear ends of the rear shaft are respectively protruded out of the first rear seat and the second rear seat, and the rear shaft is arranged with a rear stopper which restricts an axial displacement range of the rear shaft, and a rear elastic element which keep the rear shaft close to a front-end of the axial displacement range of the rear shaft.

5. The foldable scooter as described in claim 4, wherein a quick release mechanism is positioned to the underside of the front part or the rear part via an elastic bolt, the quick release mechanism is pivoted with two pairs of rockers, and the front stopper and the rear stopper are respectively inserted between a corresponding pair of the rockers.

6. The foldable scooter as described in claim 4, wherein the front elastic element is a compression spring which is sleeved on the front shaft and resisted against the first front seat and a front blocking flake fixed on the front shaft, and the rear elastic element is a compression spring which is sleeved on the rear shaft and resisted against the second rear seat and a rear blocking flake fixed on the rear shaft.

7. The foldable scooter as described in claim 1, wherein the locking mechanism comprises latches and slots engaged with the latches.

8. The foldable scooter as described in claim 1, wherein the latch rod is pivoted to the front part and the rear part defines a latch groove or forms a hook to fix a free end of the latch rod therein.

9. The foldable scooter as described in claim 1, wherein the riser has a bottom end thereof connected to a top end of the head tube of the front wheel assembly by means of a quick release folding device, the quick release folding device comprises a pedestal secured to the top end of the head tube, a post protruded upwardly from a centre of the pedestal, a clamp positioned at a bottom end of the riser, a quick release mechanism for tightly hooping the clamp to the post, a flange protruded upwardly from the pedestal in a direction parallel to the post and defining a threaded hole at a top of the flange, and two parallel rails extended outwardly from a side surface of the clamp, and wherein the rails respectively define an elongated groove therein, and the flange is inserted between the rails by a bolt which is extended through the elongated groove of one of the rails and threaded in the threaded hole, and finally extended into the elongated groove of another of the rails.

10. The foldable scooter as described in claim 9, wherein the riser is provide with a quick release sleeve mechanism at a top end thereof, and the quick release sleeve mechanism is configured with a horizontal sleeve which is perpendicular to the riser and a pair of clips below the horizontal sleeve, and wherein the handlebars are capable of being inserted into the horizontal sleeve to steer the scooter or being vertically mounted to the clips to fold the scooter.

11. The foldable scooter as described in claim 1, wherein the riser is provide with a quick release sleeve mechanism at a top end thereof, and the quick release sleeve mechanism is configured with a horizontal sleeve which is perpendicular to the riser and a pair of clips below the horizontal sleeve, and wherein the handlebars are capable of being inserted into the horizontal sleeve to steer the scooter or being vertically mounted to the clips to fold the scooter.

12. The foldable scooter as described in claim 1, wherein the positioning lever has one end thereof hinged to the pedal and another end thereof detachably hinged to the connecting base by means of a locating pin.

* * * * *